(12) United States Patent
Funabashi

(10) Patent No.: US 7,051,521 B2
(45) Date of Patent: May 30, 2006

(54) EXHAUST AFTERTREATMENT SYSTEM

(75) Inventor: Hiroshi Funabashi, Hino (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 11/041,296

(22) Filed: Jan. 25, 2005

(65) Prior Publication Data

US 2005/0166576 A1 Aug. 4, 2005

(30) Foreign Application Priority Data

Feb. 2, 2004 (JP) .............................. 2004-025167

(51) Int. Cl.
*F01N 3/00* (2006.01)
(52) U.S. Cl. .................. 60/297; 60/286; 60/287; 60/295; 60/301; 60/324; 422/170; 422/182
(58) Field of Classification Search .................. 60/286, 60/287, 288, 295, 297, 301, 303, 311, 324; 422/170, 171, 172, 177, 182
See application file for complete search history.

(56) References Cited

U.S. PATENT DOCUMENTS

| | | | | |
|---|---|---|---|---|
| 5,519,993 A * | 5/1996 | Rao et al. | ...................... | 60/288 |
| 5,746,989 A * | 5/1998 | Murachi et al. | ......... | 423/213.7 |
| 6,233,927 B1 * | 5/2001 | Hirota et al. | .................. | 60/297 |
| 6,696,031 B1 * | 2/2004 | Twigg et al. | ................ | 423/212 |
| 6,718,757 B1 * | 4/2004 | Khair et al. | .................... | 60/286 |
| 6,742,328 B1 * | 6/2004 | Webb et al. | .................... | 60/285 |
| 6,745,560 B1 * | 6/2004 | Stroia et al. | ................... | 60/286 |
| 6,758,036 B1 * | 7/2004 | Molinier | ....................... | 60/286 |
| 6,883,311 B1 * | 4/2005 | Liu | .............................. | 60/295 |

FOREIGN PATENT DOCUMENTS

| | | |
|---|---|---|
| DE | 198 50 757 A1 | 2/2000 |
| EP | 0 976 915 A2 | 2/2000 |
| FR | 2 819 549 | 7/2002 |
| JP | 2001-317332 | 11/2001 |

OTHER PUBLICATIONS

Patent Abstracts of Japan, JP 62-174519, Jul. 31, 1987.
Patent Abstracts of Japan, JP 2002-295243, Oct. 9, 2002.

* cited by examiner

*Primary Examiner*—Tu M. Nguyen
(74) *Attorney, Agent, or Firm*—Oblon, Spivak, McClelland, Maier & Neustadt, P.C.

(57) ABSTRACT

A particulate filter integrally carrying an oxidation catalyst is arranged in an exhaust pipe through which exhaust gas from a diesel engine flows. A $NO_x$-absorption reduction catalyst is arranged in the exhaust pipe and downstream of the particulate filter. A bypass line is branched from a portion of the exhaust pipe between the particulate filter and the reduction catalyst and is connected to a portion of the exhaust pipe downstream of the reduction catalyst. A selector valve is arranged at the branch point of the bypass line and may be switched over to guide the exhaust gas either to the reduction catalyst or to the bypass line. As a result, without difficultly controlling the operation of the diesel engine, the reduction catalyst is prevented from being poisoned and deteriorated by sulfate, the lowering of the ratio of $NO_x$ purification through the $NO_x$-absorption reduction catalyst is averted and prolongation of its life is attained.

3 Claims, 4 Drawing Sheets

EXHAUST AFTERTREATMENT SYSTEM

BACKGROUND OF THE INVENTION

1. Field of the Invention

The present invention relates to an exhaust aftertreatment system.

2. Description of the Related Art

Exhaust gas from a diesel engine is generally purified by a catalyst arranged in an exhaust pipe through which the exhaust gas flows. Known as this kind of catalyst is an $NO_x$-absorption reduction catalyst which has a property of oxidizing $NO_x$ in exhaust gas to temporarily absorb the same in the form of nitrate when an air/fuel ratio of the exhaust gas is lean, and conducting decomposition into $NO_x$ for reduction and purification thereof with the assistance of unburned HC and CO when the oxygen concentration in the exhaust gas is lowered.

Known as this kind of $NO_x$-absorption reduction catalyst having the above-mentioned property is, for example, a catalyst made from alumina and carrying platinum and barium or a catalyst made from alumina and carrying iridium, platinum and barium.

Particulates or particulate matter in the exhaust gas is mainly constituted by carbonic soot and a soluble organic fraction of high-boiling hydrocarbons and contains a trace of sulfate or misty sulfuric acid fraction. In order to reduce a discharged amount of particulates from the engine, a particulate filter is conventionally arranged in the exhaust pipe through which the exhaust gas flows.

FIG. 1 shows a conventional exhaust aftertreatment system in which reference numeral 1 generally denotes a diesel engine as an internal combustion engine. The engine 1 shown has a turbocharger 2 comprising a compressor 2a and a turbine 2b. Suction air 4 is guided via an air cleaner 3 and a suction pipe 5 into the compressor 2a of the turbocharger 2 for pressurization; the pressurized air 4 is cooled in an intercooler 6 and then is distributed via an intake manifold (not shown) into respective cylinders of the engine 1.

Concurrently, fuel or diesel oil is injected by a fuel injection device 13 into the respective cylinders of the engine 1 for combustion; exhaust gas 8 discharged from the cylinders of the engine 1 is fed via an exhaust manifold 7 into the turbine 2b of the turbocharger 2. The exhaust gas 8 having driven the turbine 2b is discharged out of a vehicle via an exhaust pipe 9.

Arranged in the exhaust pipe 9 is a casing 10 which accommodates an upstream $NO_x$-absorption reduction catalyst 11 and a downstream particulate filter 12 integrally carrying an oxidation catalyst. Also arranged in the exhaust pipe 9 and upstream of the casing 10 is an exhaust brake 14 which is adjustable in opening degree so as to throttle the flow path of the exhaust pipe 9 to a desired opening degree.

A specific structure of the particulate filter 12 is shown in FIG. 2. The particulate filter 12 is of a porous honeycomb structure made of ceramics such as cordierite and having lattice-like compartmentalized passages 12a. Alternate ones of the passages 12a have plugged inlets and the remaining passages 12a with unplugged open inlets are plugged at their outlets. Thus, only the exhaust gas 8 passing through thin porous compartment walls 12b which define the passages 12a is discharged downstream while the particulates are captured and accumulated on inner surfaces of the walls 12b. The oxidation catalyst is coated to the whole of the filter 12 to an extent not to bring about clogging.

More specifically, according to the exhaust aftertreatment system shown in FIG. 1, $NO_x$ in the exhaust gas 8 is absorbed in the $NO_x$-absorption reduction catalyst 11 in the form of nitrate so as to reduce $NO_x$, and the particulates in the exhaust gas 8 are captured by the particulate filter 12, whereby purified exhaust gas 8 is discharged out of the vehicle.

The above-mentioned exhaust aftertreatment system with the particulate filter is disclosed, for example, in JP 2001-317332 A.

However, there exists $SO_2$ in the exhaust gas 8 from the engine 1 which derives from sulfur in the fuel. Such $SO_2$ is oxidized on the $NO_x$-absorption reduction catalyst 11 just like $NO_x$, disadvantageously resulting in sulfate. Sulfate is more stable than nitrate so that the $NO_x$-absorption reduction catalyst 11 is poisoned and deteriorated by sulfate, leading to a problem that absorption of $NO_x$ becomes impossible and $NO_x$ purification ratio is lowered. There has been no specific proposals which have been developed to a practical level on the problem.

A technique itself for overcoming the poisoning through sulfate is known; rich combustion with an air/fuel ratio lower than theoretical air/fuel ratio and maintaining the $NO_x$-absorption reduction catalyst 11 in a high-temperature atmosphere of approximately 650° C. or more will release $SO_2$ from the reduction catalyst 11, thereby regenerating the reduction catalyst 11. This is difficult to carry out by controlling an operation of the diesel engine 1. Moreover, if the temperature of the exhaust gas 8 becomes approximately 700° C. or more, catalyst material of the $NO_x$-absorption reduction catalyst 11 chemically combined with sulfur will be crystallized so that detachment of sulfur becomes impossible and deterioration gradually progresses with no recovery of catalytic performance of the reduction catalyst 11, disadvantageously leading to a short service life of the reduction catalyst 11.

The invention was made in view of the above and has its object to provide an exhaust aftertreatment system which can prevent the $NO_x$-absorption reduction catalyst from being poisoned and deteriorated through sulfate without difficultly controlling an operation of a diesel engine, can prevent the ratio of $NO_x$ purification through the $NO_x$-absorption reduction catalyst from being lowered and can prolong the service life thereof.

BRIEF SUMMARY OF THE INVENTION

The invention is directed to an exhaust aftertreatment system, characterized in that it comprises a particulate filter arranged in an exhaust pipe through which flows exhaust gas from a diesel engine, a $NO_x$-absorption reduction catalyst arranged in the exhaust pipe and downstream of said particulate filter, a bypass line for diverting the exhaust gas having passed through said particulate filter from the reduction catalyst to downstream, and a selector valve adapted to be switched over to guide the exhaust gas having passed through said particulate filter either to the reduction catalyst or to the bypass line.

The exhaust aftertreatment system may further comprise an outer cylinder into which the exhaust gas having passed through the particulate filter is guided, an inner cylinder coaxially arranged in the outer cylinder and to which the $NO_x$-absorption reduction catalyst is charged and a space between the inner and outer cylinders utilized as bypass line, said sector valve arranged at an inlet in said outer cylinder.

In this instance, a valvate cylinder is arranged in the inlet in said outer cylinder such that an axis of said valvate cylinder extends perpendicular to an axis of the outer cylinder. The valvate cylinder is formed with an exhaust gas guide port through which the exhaust gas having passed through the particulate filter is guided, a first port in communication with an inside of the inner cylinder and a second port in communication with the bypass line. Arranged in the valvate cylinder is a valve body which may be switched over between a position where the exhaust gas guide port is communicated with the first port and the second port is blocked off and a position where the exhaust gas guide port is communicated with the second port and the first port is blocked off, thereby providing the selector valve.

The exhaust aftertreatment system may further comprise an HC addition device for adding HC to the exhaust gas upstream of the $NO_x$-absorption reduction catalyst to produce an oxidative reaction of said HC on the reduction catalyst, reaction heat thereof being utilized to raise in temperature a catalyst bed of the reduction catalyst over a predetermined temperature so as to gasify and detach sulfate lingering on the reduction catalyst.

In this instance, preferably, the $NO_x$-absorption reduction catalyst has a downstream end integrally carrying an oxidation catalyst.

Now, embodiments of the invention will be described in conjunction with the attached drawings.

DETAILED DESCRIPTION OF THE PREFERRED EMBODIMENTS

Figure 1:
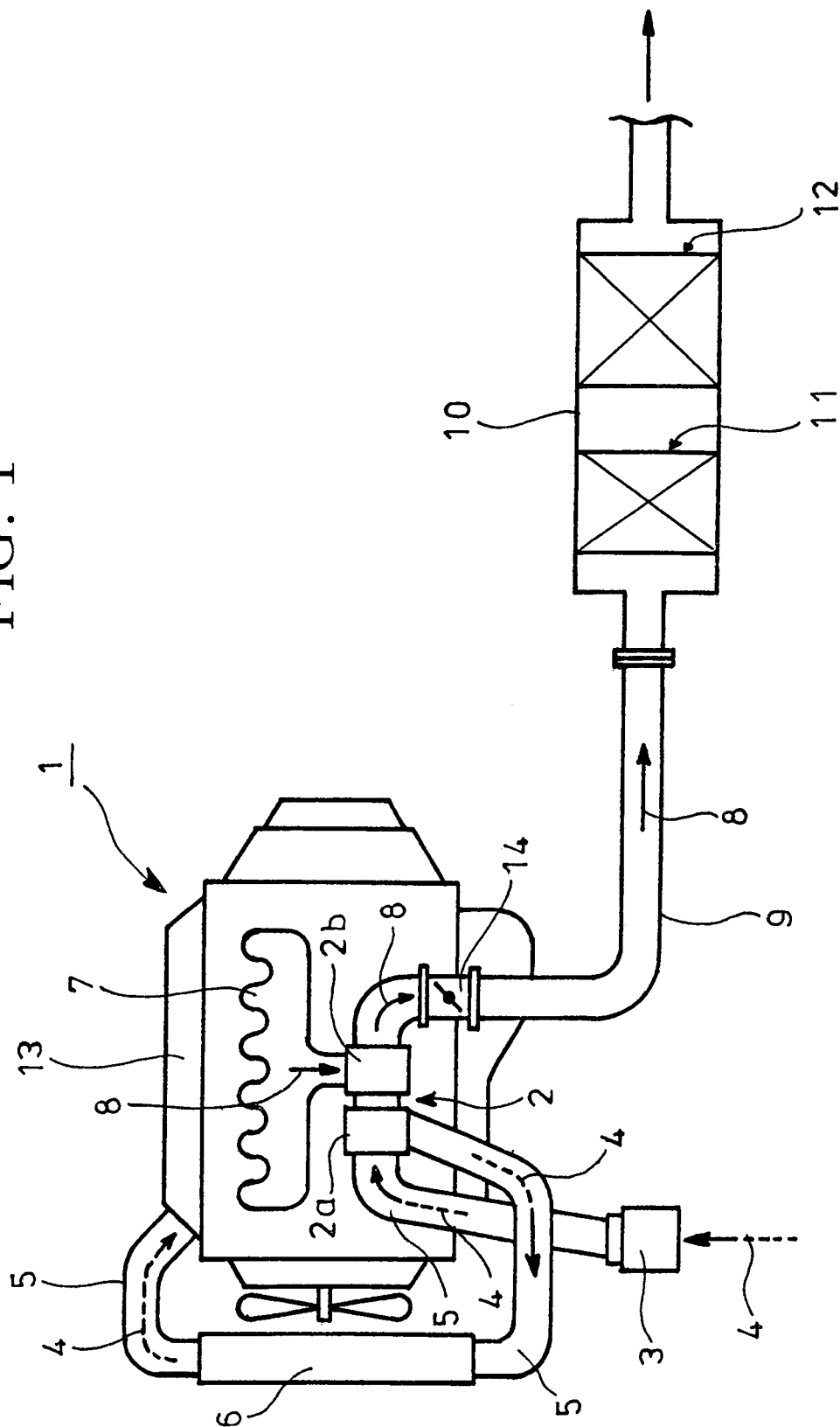
FIG. 1 is a schematic view showing a conventional exhaust aftertreatment system.
Figure 2:
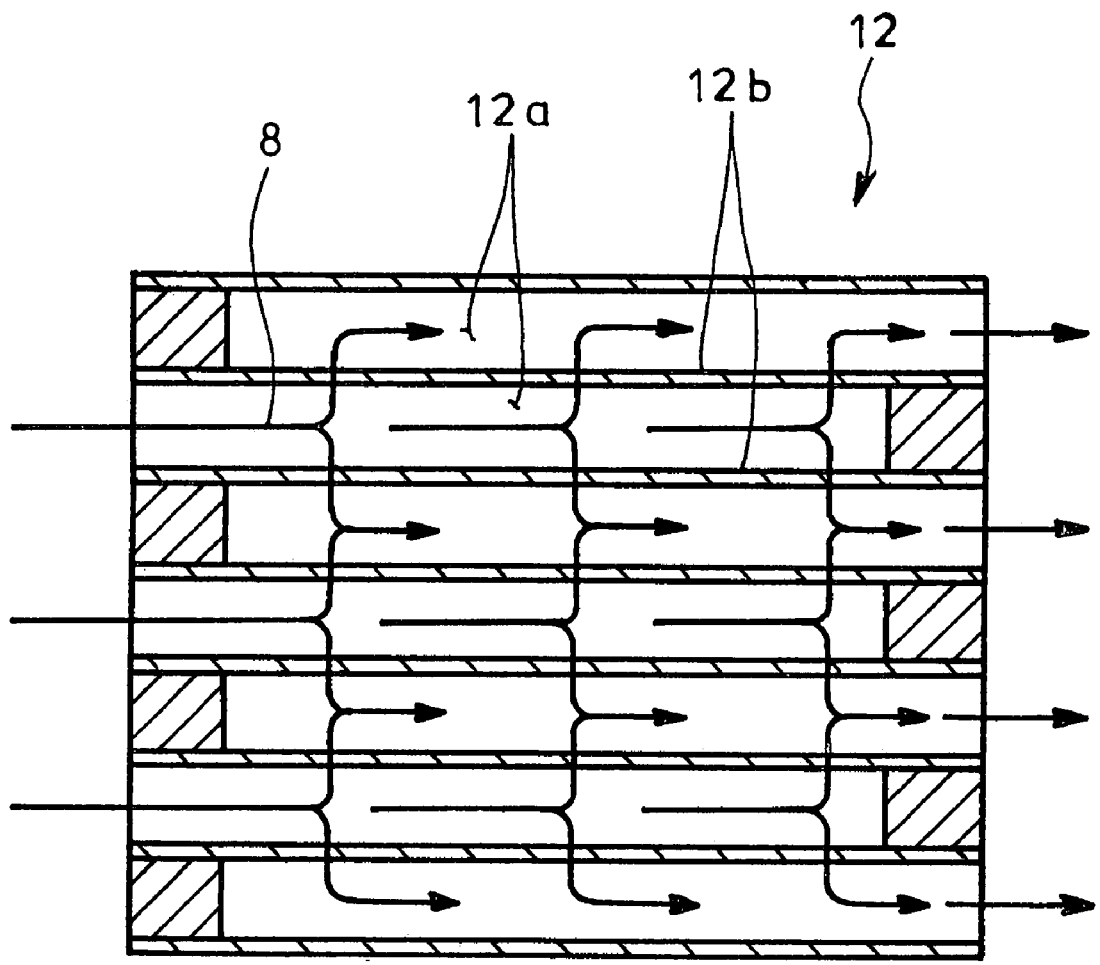
FIG. 2 is a sectional view showing particulars of a particulate filter.
Figure 3:
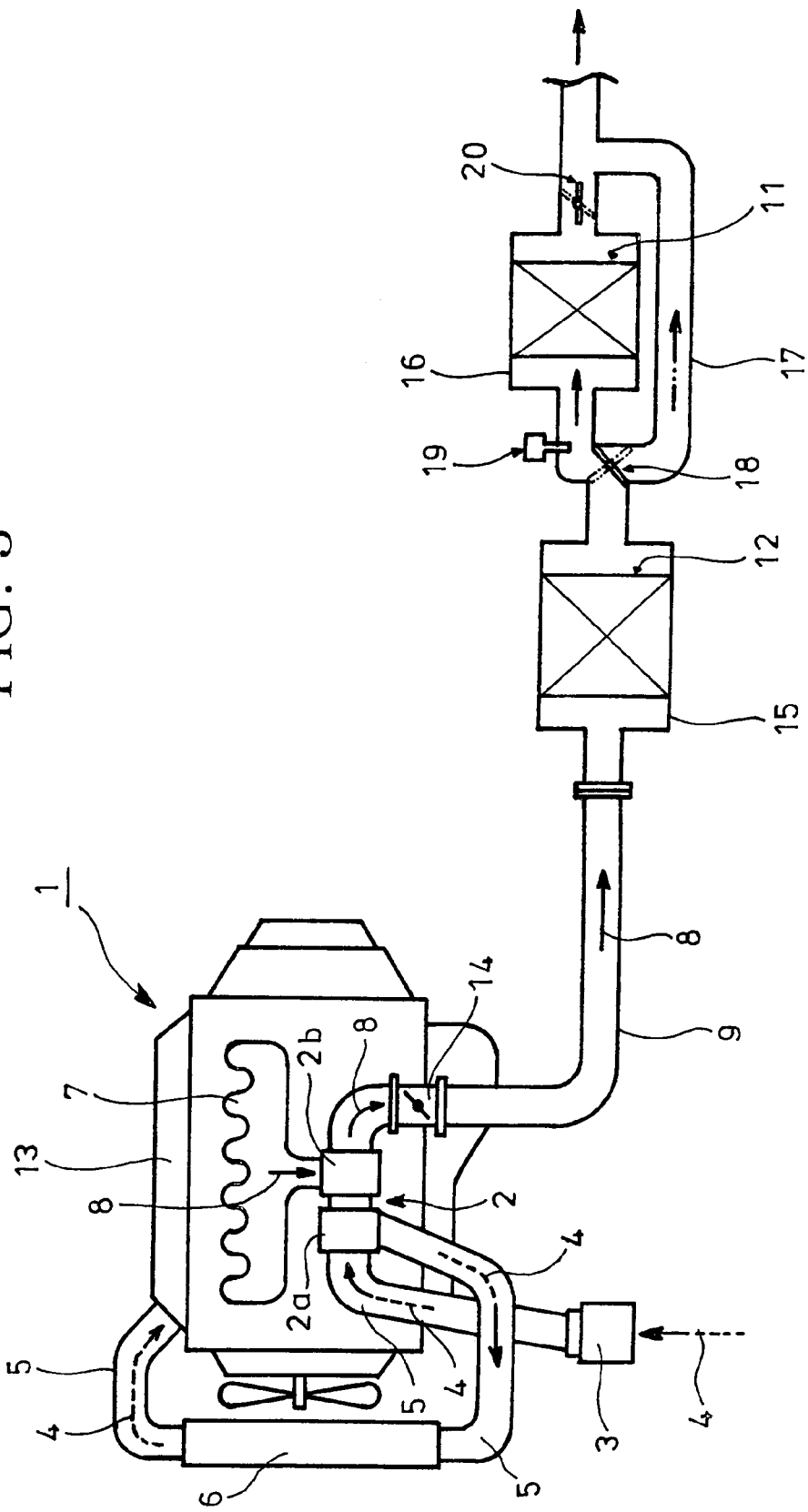
FIG. 3 is a schematic view showing an embodiment of the invention.

FIG. 3 shows an embodiment of the invention in which parts similar to those in FIGS. 1 and 2 are designated by the same reference numerals and whose fundamental structure is the same as that in the conventional apparatus shown in FIGS. 1 and 2. The embodiment is characteristic in that, as shown in FIG. 3, a filter casing 15 is arranged in an exhaust pipe 9 through which flows exhaust gas 8 from a diesel engine 1. The filter casing 15 accommodates a particulate filter 12 which in turn integrally carries an oxidation catalyst. Arranged in the exhaust pipe 9 and downstream of the particulate filter 12 is a catalyst casing 16 which accommodates an $NO_x$-absorption reduction catalyst 11. The exhaust pipe 9 has a bypass line 17 branched from the pipe 9 between the particulate filter 12 and the $NO_x$-absorption reduction catalyst 11 and connected to the exhaust pipe 9 downstream of the reduction catalyst 11. Arranged in a connection between the exhaust pipe 9 and the bypass line 17 is a selector valve 18 which may be changed over to guide the exhaust gas 8 either into the $NO_x$-absorption reduction catalyst 11 or into the bypass line 17.

In this embodiment, an HC addition device 19 for addition of HC to the exhaust gas 8 is arranged at an inlet side of the $NO_x$-absorption reduction catalyst 11 to produce oxidative reaction on the reduction catalyst 11 of HC added by the addition device 19, reaction heat thereof being utilized to raise in temperature a catalyst bed of the reduction catalyst 11 over a predetermined temperature so as to gasify and detach sulfate lingering on the reduction catalyst 11.

Arranged at an outlet side of the $NO_x$-absorption reduction catalyst 11 is a switching valve 20 which prevents the exhaust gas 8 flowing in the bypass line 17 from passing into the reduction catalyst 11 when the selector valve 18 is changed over toward the bypass line 17.

The $NO_x$-absorption reduction catalyst 11 has a downstream end integrally carrying an oxidation catalyst.

Next, mode of operation of the embodiment will be described.

There exists $SO_2$ in the exhaust gas 8 from the diesel engine 1 which derives from sulfur in the fuel. Such $SO_2$ is captured by and oxidized on the particulate filter 12, resulting in lingering thereof as sulfate. However, the particulate filter 12, which is of the porous honeycomb structure made of ceramics such as cordierite, tends to be less effected by poisoning and deterioration through sulfate in comparison with the $NO_x$-absorption reduction catalyst 11 and therefore no problem occurs. Thus, most of $SO_2$ in the exhaust gas 8 is captured by the particulate filter 12 and hardly proceed to the $NO_x$-absorption reduction catalyst 11, so that there is no fear of the reduction catalyst 11 being poisoned and deteriorated by sulfate, resulting in no inhibition of $NO_x$ absorption and no lowering of $NO_x$ purification ratio.

When sulfate has been accumulated on the particulate filter 12 to some extent, the temperature of the exhaust gas 8 is raised, for example, by throttling in flow rate and increasing in pressure the exhaust gas 8 by means of the exhaust gas brake 14. This raises the temperature of the particulate filter 12 so that sulfate and $SO_2$ gas can be detached from the particulate filter 12 for regeneration thereof; then, the selector valve 18 is switched over toward the bypass line 17 and the switching valve 20 is closed so that sulfate and $SO_2$ gas discharged from the particulate filter 12 are diverted from the $NO_x$-absorption reduction catalyst 11 to flow downstream; thus, there is no fear of them being attached as sulfate to the $NO_x$-absorption reduction catalyst 11.

In the embodiment, the HC addition device 19 for addition of HC to the exhaust gas 8 is arranged at the inlet side of the $NO_x$-absorption reduction catalyst 11. Therefore, even if some of sulfate and $SO_2$ gas are not captured by and pass through the particulate filter 12 and are attached as sulfate to the $NO_x$-absorption reduction catalyst 11 for lingering, then the selector valve 18 is switched over toward the reduction catalyst 11 so as to make the exhaust gas 8 flow through the reduction catalyst 11 while HC is added by the HC addition device 19 to the exhaust gas 8 upstream of the reduction catalyst 11. This produces the oxidative reaction of HC on the $NO_x$-absorption reduction catalyst 11, reaction heat thereof being utilized to raise in temperature the catalyst bed of the reduction catalyst 11 over the predetermined temperature; immediately thereafter the selector valve 18 is switched over toward the bypass line 17 so that the exhaust gas 8 is diverted from the $NO_x$-absorption reduction catalyst 11 while HC is added again to the reduction catalyst 11. As a result, relative excess ratio to the added amount of HC is lowered to attain rich atmosphere with the air/fuel ration smaller than the theoretical air/fuel ratio so that sulfate lingering on the $NO_x$-absorption reduction catalyst 11 is gasified and detached.

If periodically the selector valve 18 is switched over toward the bypass line 17 to divert the exhaust gas 8 from the $NO_x$-absorption reduction catalyst 11 while HC is added to the reduction catalyst 11 by the HC addition device 19, then relative excess air ratio to the added amount of HC is lowered to enhance the reaction selectivity of HC and $NO_x$, whereby $NO_x$ is positively decomposed and discharged from the reduction catalyst 11 to attain satisfactory regeneration of the reduction catalyst 11. The discharged $NO_x$ may be reacted with said HC on the $NO_x$-absorption reduction catalyst 11 for satisfactory reduction and purification thereof.

Moreover, the $NO_x$-absorption reduction catalyst 11 has the downstream end integrally carrying the oxidation catalyst. Therefore, even if an amount of HC added by the HC addition device 19 to the exhaust gas 8 is too much to produce the oxidative reaction of all of said HC on the $NO_x$-absorption reduction catalyst 11, unoxidized HC is oxidized on the oxidation catalyst, thereby preventing the unoxidized HC from leaking to outside.

Thus, without difficultly controlling the operation of the diesel engine 1, poisoning and deterioration of the $NO_x$-absorption reduction catalyst 11 through sulfate can be prevented, lowering of the ratio of $No_x$ purification through the reduction catalyst 11 can be averted and the service life of the reduction catalyst 11 can be prolonged.

Figure 4:
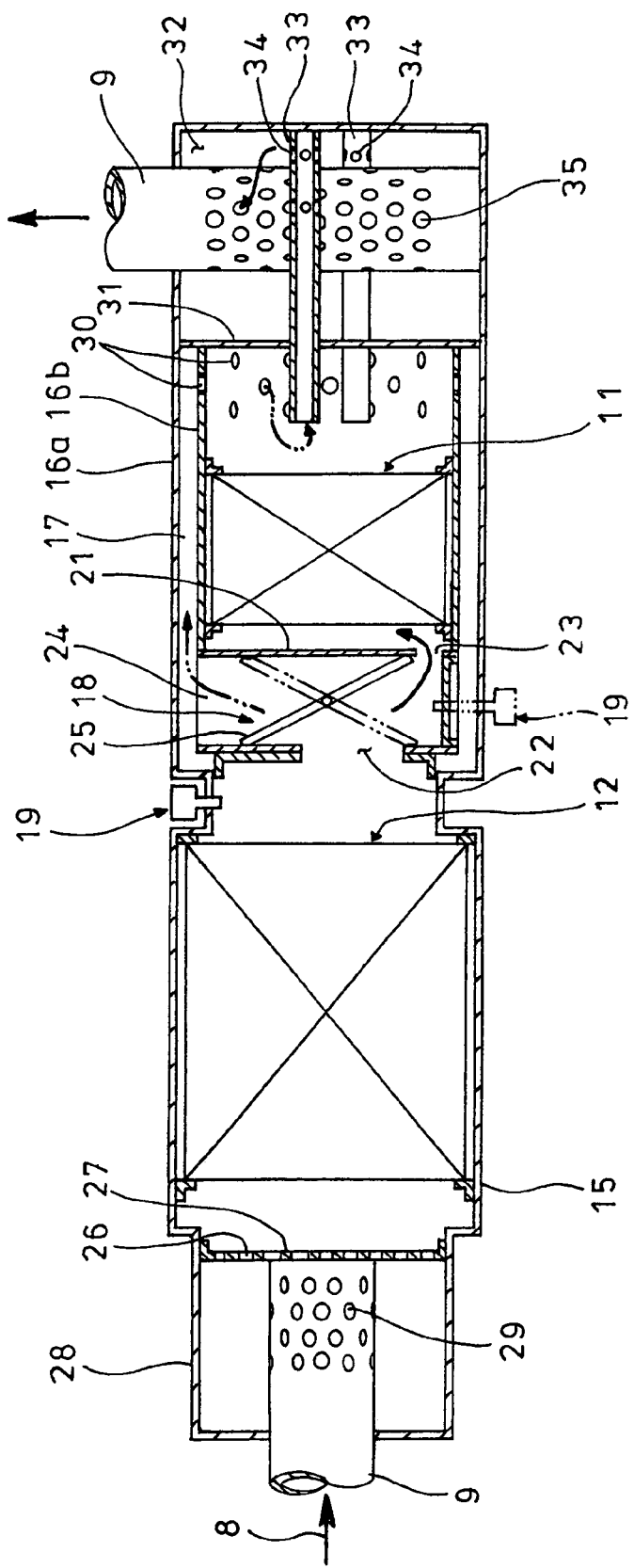
FIG. 4 is a sectional view showing main portions of a further embodiment of the invention.

FIG. 4 shows a further embodiment of the invention in which parts similar to those in FIG. 3 are represented by the same reference numerals and whose fundamental structure is the same as that in FIG. 3. This embodiment is characteristic in that, as shown in FIG. 4, the exhaust gas 8 having passed through the particulate filter 12 is guided to an outer cylinder 16a within which coaxially arranged is an inner cylinder 16b charged with the $NO_x$-absorption reduction catalyst 11, a space between the inner and outer cylinders 16b and 16a being utilized as bypass line 17, a selector valve 18 being arranged in an inlet in said outer cylinder 16a.

In the embodiment, a valvate cylinder 21 is arranged in the inlet in the outer cylinder 16a such that an axis of the valvate cylinder 21 extends perpendicular to an axis of the outer cylinder 16a. The valvate cylinder 21 is formed with the exhaust gas guide port 22 through which the exhaust gas 8 having passed through the particulate filter 12 is guided, a first port 23 in communication with an inside of the inner cylinder 16b and a second port 24 in communication with the bypass line 17. A valve body 25 is arranged in the valvate cylinder 21 such that it may be switched over either into a position (shown in solid lines in FIG. 4) where the exhaust gas guide port 22 is communicated with the first port 23 and the second port 24 is blocked off or into a position (shown in imaginary lines in FIG. 4) where the exhaust gas guide port 22 is communicated with the second port 24 and the first port 23 is blocked off, thereby providing the selector valve 18.

The filter casing 15 has an upstream end integrally formed with an upstream exhaust gas chamber 28 which in turn is partitioned from the filter casing 15 by a plate 27 with a number of communication pores 26. The exhaust pipe 9 extending from the diesel engine 1 passes through the exhaust gas chamber 28. An inserted portion of the exhaust pipe 9 in the exhaust gas chamber 28 is formed with a number of communication pores 29.

The bypass line 17 formed in the outer cylinder 16a has a downstream end, and the inner cylinder 16b has a corresponding downstream end formed with a number of communication pores 30. The bypass line 17 and the downstream end of the inner cylinder 16b are closed by a separate plate 31 formed in the outer cylinder 16a to provide a downstream exhaust gas chamber 32 in the downstream end of the outer cylinder 16a. A communicating tube or tubes 33 pass through the separate plate 31. A downstream end of the tube 33 or each of the tubes 33 is formed with a number of communication pores 34. The exhaust pipe 9 extends to outside from the exhaust gas chamber 32 in the outer cylinder 16a partitioned by the separate plate 31. A portion of the exhaust pipe 9 inside of the exhaust gas chamber 32 in the outer cylinder 16a is formed with a number of communication pores 35.

In FIG. 4, the HC addition device 19 is arranged as shown in solid lines at a connection between the filter casing 15 and the outer cylinder 16a; alternatively, as shown in imaginary lines in FIG. 4, it may be arranged adjacent to the first port 23 for the selector valve 18.

In the embodiment shown in FIG. 4, the exhaust gas 8 is guided via the exhaust pipe 9 and the communication pores 29 into the upstream exhaust gas chamber 28 where it is further guided via the communication pores 26 of the plate 27 into the particulate filter 12 in the filter casing 15. When the selector valve 18 is switched over to the position (shown in solid lines in FIG. 4) where the exhaust gas guide port 22 is communicated with the first port 23 and the second port 24 is blocked off, the exhaust gas 8 having passed through the particulate filter 12 is guided via the ports 22 and 23 to the $NO_x$-absorption reduction catalyst 11, then passing through the communicating tube or tubes 33, the communication pores 34 into the downstream exhaust gas chamber 32 where it is guided via the communication pores 35 into the exhaust pipe 9, flowing further to downstream.

When the selector valve 18 is switched over to the position (shown in imaginary lines in FIG. 4) where the exhaust gas feed port 22 is communicated with the second port 24 and the first port 23 is blocked off, the exhaust gas 8 having passed through the filter 12 is guided via the ports 22 and 24 to the bypass line 17, then passing through the communication pores 30 into the downstream end of the inner cylinder 16b, then passing through the communicating tube or tubes 33 and the communication pores 34 into the downstream exhaust gas chamber 32 where it is guided via the communication pores 35 into the exhaust pipe 9, flowing further to downstream.

With the construction as shown in FIG. 4, the same effects and advantages as those in the embodiment shown in FIG. 3 can be obtained. In addition thereto, the $NO_x$-absorption reduction catalyst 11, the bypass line 17 and the selector valve 18 can be accommodated in the single cylindrical body compact in size, advantageously resulting in no limitation in mountability to the vehicle.

It is to be understood that an exhaust aftertreatment system according to the invention is not limited to the above embodiments and that various changes and modifications may be made without leaving the gist of the invention.

As is clear from the above, according to the exhaust aftertreatment system of the invention, without difficultly controlling the operation of the diesel engine, poisoning and deterioration of the $NO_x$-absorption reduction catalyst through sulfate can be prevented, lowering of the ratio of $NO_x$ purification through the $NO_x$-absorption reduction catalyst can be averted and a prolonged service life thereof is obtained.

What is claimed is:

1. An exhaust aftertreatment system, comprising
    a particulate filter arranged in an exhaust pipe through which flows exhaust gas from a diesel engine;
    a $NO_x$-absorption reduction catalyst arranged in the exhaust pipe and downstream of said particulate filter;
    a bypass line for diverting the exhaust gas having passed through said particulate filter from the reduction catalyst to downstream;
    a selector valve adapted to be switched over to guide the exhaust gas having passed through said particulate filter either to the reduction catalyst or to the bypass line;

an outer cylinder into which the exhaust gas having passed through the particulate filter is guided;

an inner cylinder coaxially arranged in said outer cylinder and to which the $NO_x$-absorption reduction catalyst is charged;

a space between said inner and outer cylinders utilized as the bypass line, said selector valve arranged at an inlet in said outer cylinder; and a valvate cylinder is arranged in the inlet in said outer cylinder such that an axis of said valvate cylinder extends perpendicular to an axis of the outer cylinder, said valvate cylinder being formed with an exhaust gas guide port through which the exhaust gas having passed through the particulate filter is guided, a first port in communication with an inside of the inner cylinder and a second port in communication with the bypass line, a valve body being arranged in the valvate cylinder such that the valve body may be switched over between a position where the exhaust gas guide port is communicated with the first port and the second port is blocked off and a position where the exhaust gas guide port is communicated with the second port and the first port is blocked off, thereby providing the selector valve.

2. The system according to claim 1, further comprising:

a HC addition device for adding HC to the exhaust gas upstream of the NOx-absorption reduction catalyst to produce an oxidative reaction of said HC on the reduction catalyst, reaction heat thereof being utilized to raise in temperature a catalyst bed of the reduction catalyst over a predetermined temperature so as to gasify and detach sulfate lingering on the reduction catalyst.

3. The system according to claim 1 wherein the NOx-absorption reduction catalyst has a downstream end integrally carrying an oxidation catalyst.

* * * * *